(12) United States Patent
Kumar

(10) Patent No.: US 10,311,130 B1
(45) Date of Patent: Jun. 4, 2019

(54) DYNAMIC PAGE TRANSITIONS IN ELECTRONIC CONTENT

(71) Applicant: Amazon Technologies, Inc., Seattle, WA (US)

(72) Inventor: Sudhir Kumar, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 197 days.

(21) Appl. No.: 15/150,010

(22) Filed: May 9, 2016

(51) Int. Cl.
*G06F 17/21* (2006.01)
*G06F 3/0483* (2013.01)
*G06T 13/80* (2011.01)
*G06T 11/60* (2006.01)
*G06F 17/22* (2006.01)

(52) U.S. Cl.
CPC .......... *G06F 17/212* (2013.01); *G06F 3/0483* (2013.01); *G06F 17/217* (2013.01); *G06F 17/2205* (2013.01); *G06F 17/2247* (2013.01); *G06T 11/60* (2013.01); *G06T 13/80* (2013.01)

(58) Field of Classification Search
None
See application file for complete search history.

(56) References Cited

U.S. PATENT DOCUMENTS

| | | | | |
|---|---|---|---|---|
| 9,377,932 B2* | 6/2016 | Ying | ................. | G06F 3/0483 |
| 2008/0059583 A1* | 3/2008 | Mao | ................. | H04L 12/1813 |
| | | | | 709/205 |
| 2010/0064223 A1* | 3/2010 | Tilton | ................. | G06T 13/80 |
| | | | | 715/732 |
| 2010/0313116 A1* | 12/2010 | Hyman | ................. | G06Q 10/00 |
| | | | | 715/240 |
| 2013/0076759 A1* | 3/2013 | Zhao | ................. | G06T 13/80 |
| | | | | 345/473 |
| 2013/0091417 A1* | 4/2013 | Cordasco | ................. | G06F 17/30902 |
| | | | | 715/234 |
| 2013/0144928 A1* | 6/2013 | Gittelman | ................. | H04L 67/10 |
| | | | | 709/201 |
| 2013/0169647 A1* | 7/2013 | Nations | ................. | G06T 13/20 |
| | | | | 345/473 |
| 2013/0326345 A1* | 12/2013 | Haggart | ................. | G06F 17/24 |
| | | | | 715/255 |
| 2014/0096006 A1* | 4/2014 | Berglund | ................. | G06T 13/80 |
| | | | | 715/732 |

(Continued)

*Primary Examiner* — Howard Cortes
(74) *Attorney, Agent, or Firm* — Lee & Hayes, P.C.

(57) ABSTRACT

This disclosure is directed to methods, apparatuses, and systems for providing dynamic page transitions within electronic content presented on an electronic display. In some instances, electronic content may include text, images, video, animations, etc., and may include content that is common between multiple pages. For example, within a chapter of a book, the pages may include text over a common background. While navigating between such pages including common content, a user experience may be improved by providing transitions between the content that differs between pages (i.e., text), while refraining from providing transitions between common elements (i.e., a background). Pages of the electronic content may be represented in a view tree with individual content layers associated with a resource identifier uniquely identifying content and a view index identifying an order of the content layer when presented on a display.

20 Claims, 8 Drawing Sheets

(56) References Cited

U.S. PATENT DOCUMENTS

| | | | |
|---|---|---|---|
| 2014/0365959 A1* | 12/2014 | Mondello | G06T 13/80 715/790 |
| 2016/0085762 A1* | 3/2016 | Trehan | G11B 27/034 715/202 |
| 2016/0092087 A1* | 3/2016 | Yoon | G06F 3/04847 345/173 |
| 2016/0267700 A1* | 9/2016 | Huang | G06F 3/04842 |
| 2017/0300200 A1* | 10/2017 | Chak | G06F 3/0483 |

* cited by examiner

DYNAMIC PAGE TRANSITIONS IN ELECTRONIC CONTENT

BACKGROUND

Users have traditionally consumed media items (such as books, magazines, newspapers, etc.) in hard-copy form. For instance, a user may obtain a physical book from a bookstore or a library. The user can read the book by manually flipping through its pages in conventional fashion.

A user may now also receive and consume some media items in electronic form. The user may read a document (e.g., a book) in electronic form, that is, by reading the book as presented on an electronic display. When the user reads the book in electronic form, transitions between pages are often modeled to recreate the user experience of manually flipping through its pages.

A provider of electronic media items faces various challenges, as many users continue to prefer consuming media items in traditional form. The provider confronts the task of capturing the interest of such users, while providing a solution that is viable from a technical perspective and a business-related perspective. For instance, the provider faces the challenge of rendering the book's pages in an efficient manner, but that does not cause the user to lose interest in the book.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1A:
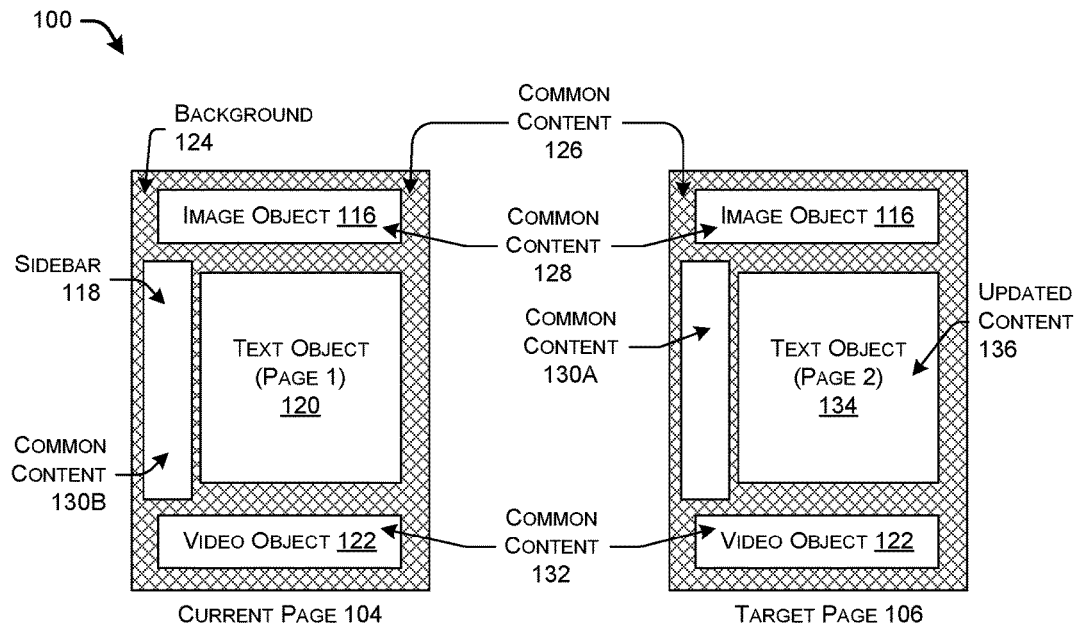
FIG. 1A shows an example of an illustrative dynamic page transition of electronic content displayed on an electronic device.
Figure 1A:
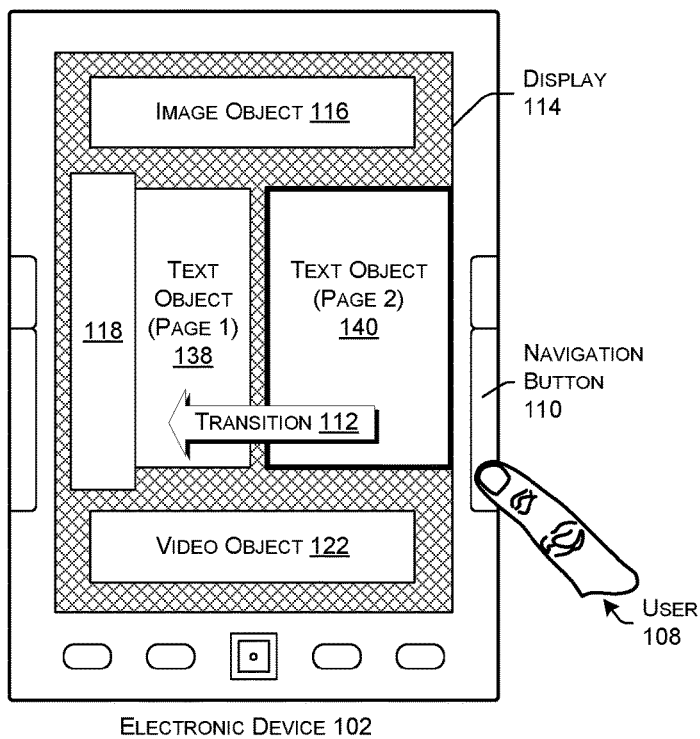

This disclosure describes methods, apparatuses, and systems for providing dynamic page transitions of electronic content presented on an electronic display. Typically, when navigating between pages of electronic content, a transition is provided between a current page and a target page (e.g., a subsequent page, a prior page, etc.), where the transition is applied to all content displayed on the display. In some instances, electronic content may include text, images, video, animations, etc., and may include content that is common between multiple pages. For example, within a chapter of a book, the pages may include text over a common background. While navigating between such pages including common content, a user experience may be improved by providing transitions between the content that differs between pages (i.e., the text), while refraining from providing transitions between common elements (i.e., the background).

In some instances, content may include a table containing information that spans across multiple pages when rendered on an electronic display. As a user navigates through the table, the common content may include table headings and a framework (e.g., gridlines) of the table. Thus, when the user navigates across pages to view the table, the common content of the table may remain unchanged, while a transition may be provided to the varying table values. In this manner, user experience is improved by maintaining context of the table while displaying table data.

In order to accomplish the dynamic and selective transitions of electronic content discussed herein, electronic content may be decomposed into pages containing individual layers of content, with each layer associated with identification information, transition data, etc. Each page may be represented as a view tree, with each page represented as a root node and content layers within the page represented as children nodes or the root node. For example, for a particular page, the children nodes may include a text node, a background node, an image node, a video node, a sidebar node, and/or a table node. Each child node may be linked to the respective parent node and/or to other sub-child nodes. Each child node may include the data to be displayed, a resource identifier identifying the data to be displayed, and additional fields including the data size, a view index (e.g., to determine whether content is layered above or below other content on the display), location data of the content on the page, and/or transition data including one or more possible transitions associated with the data. In some instances, individual content layers may be compared when transitioning between a current page and a target page, for example, by comparing one or more of the resource identifiers, data size, etc., to determine if the content layer is common between the current page and the target page. If the content layer is the same, in some instances, no transition is applied when navigating between the pages. In some instances, when the content layer is determined to be updated content, a transition is determined based on the transition data associated with the content layer and/or based upon the location of other content layers presented on the display. Thus, in this manner, transitions can be dynamically and selectively applied between a current page and a target page based upon common content and/or updated content.

In this manner, the methods, apparatuses, and systems described herein improve a functioning of a computing device by reducing an amount of data subject to a transition when navigating between pages in an electronic book, for example. As such, an amount of processing may be reduced, resulting in reduced power consumption of the device. Similarly, as the amount of processing for transitioning may be decreased, this may allow the computing device to perform other related or unrelated processing tasks, thereby improving the functioning of the computing device. Further, transitions may be provided faster and smoother by reducing an amount of data involved in the transition. Further, the dynamic transitions discussed herein improve a quality of a user experience by allowing the user to focus of what content is changing on a page, rather than animating a transition of all content on a page, regardless if the content is common between a current page and a target page.

The methods, apparatuses, and systems described herein can be implemented in a number of ways. Example implementations are provided below with reference to the following figures.

FIG. 1A shows an example 100 of an illustrative dynamic page transition of electronic content displayed on an electronic device 102. The example 100 illustrates the electronic device 102 transitioning from a current page 104 to a target page 106. A user 108 may provide an indication to the electronic device 102 via one or more navigation buttons 110 to transition from the current page 104 to target page 106 via the transition 112. For example, and without limitation, the transition 112 may include one or more of a sliding transition (e.g., right to left, left to right, up to down, down to up, etc.), a fade transition, a cut transition, a push transition, a wipe transition, an uncover transition, a cover transition, etc.

In some instances, the current page 104 may include any content capable of being displayed via a display 114 of the electronic device 102, such as an image object 116, a sidebar 118, a text object 120, a video object 122, and a background 124. For example, in some instances, the image object 116 may include one or more images in raster formats, vector formats, or compound formats, including but not limited to image formats such as JPEG, Exif, TIFF, GIF, BMP, PNG, CGM SVG, etc. In some instances, the sidebar 118 may include content on a display that is typically common to multiple pages, and may include text, graphics, or video. In some instances, the sidebar may include any content, and may refer to a general location on a display. In some instances, the sidebar 118 may include information adjacent to another layer that is graphically separate but with contextual information. In some instances, the text object 120 may include any format of text, including text capable of word-wrapping. In some instances, the text object 120 may be resized to any size or font by a user or by an author. In some instances, a video object 122 may include any video format, including but not limited to animations, video, mp4, GIF, Flash, MOV, WMV, RM, etc. In some instances, the background 124 may include any image or video as a lowest layer on a display (i.e., without any content below that layer). In some instances, the background 124 may include patterns, images, colors, etc. As may be appreciated, any combination of content may be presented via the display 114. Further, in some instances, there may be audio associated with the video object 122, for example, that may be presented along with the content on the display 114. In some instances, one or more objects of the current page may also include haptic feedback to be presented in association with the various objects.

In some instances, there may be common content between the current page 104 presented on the display 114 of the electronic device 102 and the target page 106 to be presented on the electronic device 102. For example, the current page 104 and the target page 106 may share as common content 126 the same background, illustrated with crosshatching as the background 124. Further, common content 128 may include the image object 116, common content 130A and 130B (collectively referred to as common content 130) may include the sidebar 118, and common content 132 may include the video object 122. In some instances, common content between pages may be identified by comparing resource identifiers, data size, etc., as discussed herein.

After the common content 126, 128, 130, and 132 is identified between the current page 104 and the target page 106, the electronic device 102 may determine to apply the transition 112 to animate the navigation from the current page 104 to the target page 106. For example, the transition 112 may include transitioning between the text object 120 (page 1) to a text object 134 (page 2), also referred to as updated content 136. As represented in FIG. 1A, the transition 112 may be illustrated as a sliding transition animating a text object 138 sliding from right to left on the display 114 of the electronic device 102. Further, the transition 112 may include a sliding transition animating a text object 140 sliding from right to left on the display 114 of the electronic device 102. That is, the transition 112 may include sliding the text object 138 (page 1) out of the display 114 while sliding the text object 140 (page 2) into the display 114. In some instances, the transition 112 of the text object 138 may be such that the text object 138 slides below the sidebar 118 (i.e., such that transitioning content does not interfere with common content). As illustrated, the text object 138 may represent the text object 120, and the text object 140 may represent the text object 134, during the transition 112 from the current page 104 to the target page 106.

Figure 1B:
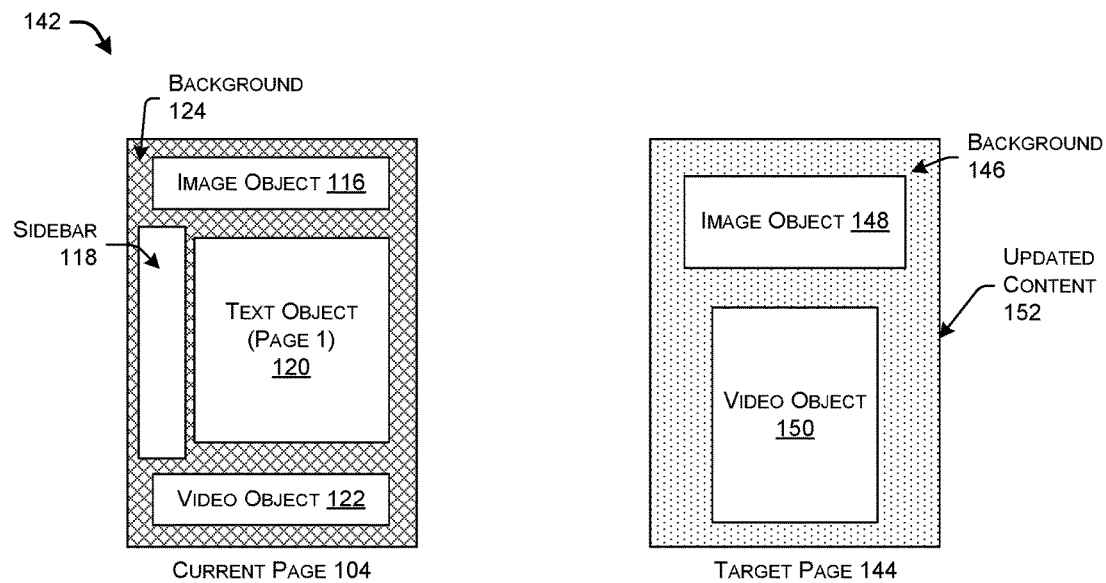
FIG. 1B shows another example of an illustrative dynamic page transition of electronic content displayed on an electronic device.
Figure 1B:
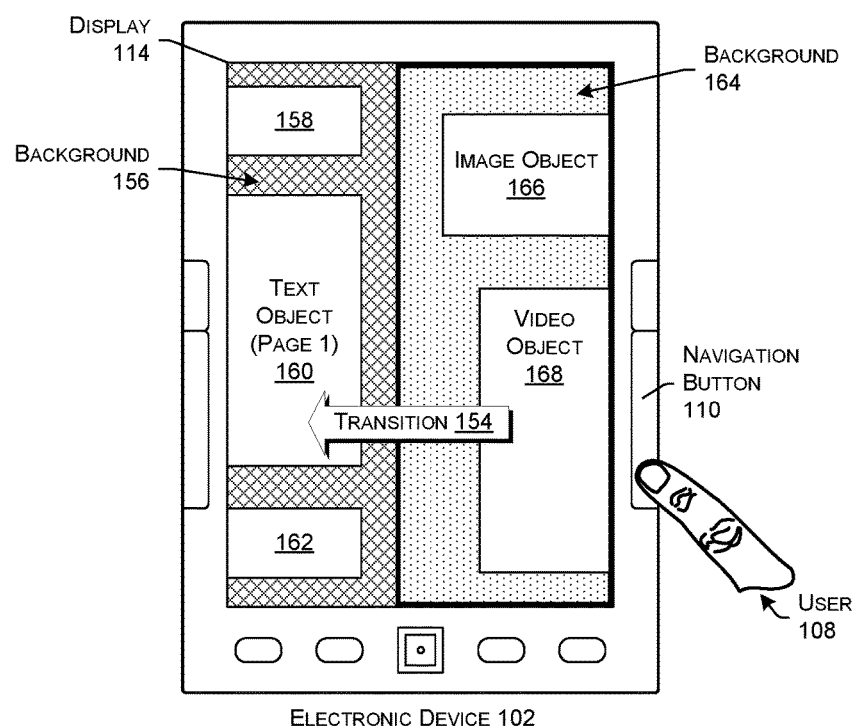

FIG. 1B shows another example 142 of an illustrative dynamic page transition of electronic content displayed on the electronic device 102. In this example 142, the current page 104 may transition to a target page 144, which is different from the target page 106 in FIG. 1A. For example, the target page 144 may include a background 146, an image object 148, and/or a video object 150. In some instances, the target page 144 may not share any common content with the current page 104. Thus, in this example 142, the entire target page 144 may be represented as updated content 152.

When the user 108 navigates within a book, for example, and provides an indication via the navigation button 110 to transition from the current page 104 to the target page 144, the electronic device 102 may animate a transition 154 on the display 114 to transition from the current page 104 to the target page 144. In this example 142, for example, there is no common content between the current page 104 and the target page 144, in which case, the transition 154 may animate all content transitioning in the display 114 in FIG. 1B. For example, the transition 154 may include animating a background 156, an image object 158, a text object 160, and a video object 162 leaving the display 114, while the updated content 152 represented as a background 164, an image object 166, and a video object 168 may be animated entering the display 114 of FIG. 1B. In some instances, the background 156 may correspond to the background 124; the image object 158 may correspond to the image object 116; the text object 160 may correspond to the text object 120; and the video object 162 may correspond with the video object 122, during the transition 154. In some instances, the background 164 may correspond to the background 146; the image object 166 may correspond to the image object 148; and the video object 168 may correspond to the video object 150, during the transition 154.

Thus, as illustrated in FIGS. 1A and 1B, dynamic transitions may be provided between individual content objects in a current page and a target page. Additionally, a transition between a current page (e.g., 104) and a first target page (e.g., 106) may be different than a transition between the current page and a second target page (e.g., 144). For example, in the first transition (e.g., between 104 and 106) the individual content may transition via a sliding transition, while in the second transition (e.g., between 104 and 144) the content may transition via a wipe or fade transition. That is, the transitions discussed herein may be applied individually between content items or between pages, based in part on the content between pages (e.g., whether the current page and a target page share common content), in order to improve a user experience and in order to improve a functioning of the electronic device 102.

Figure 2A:
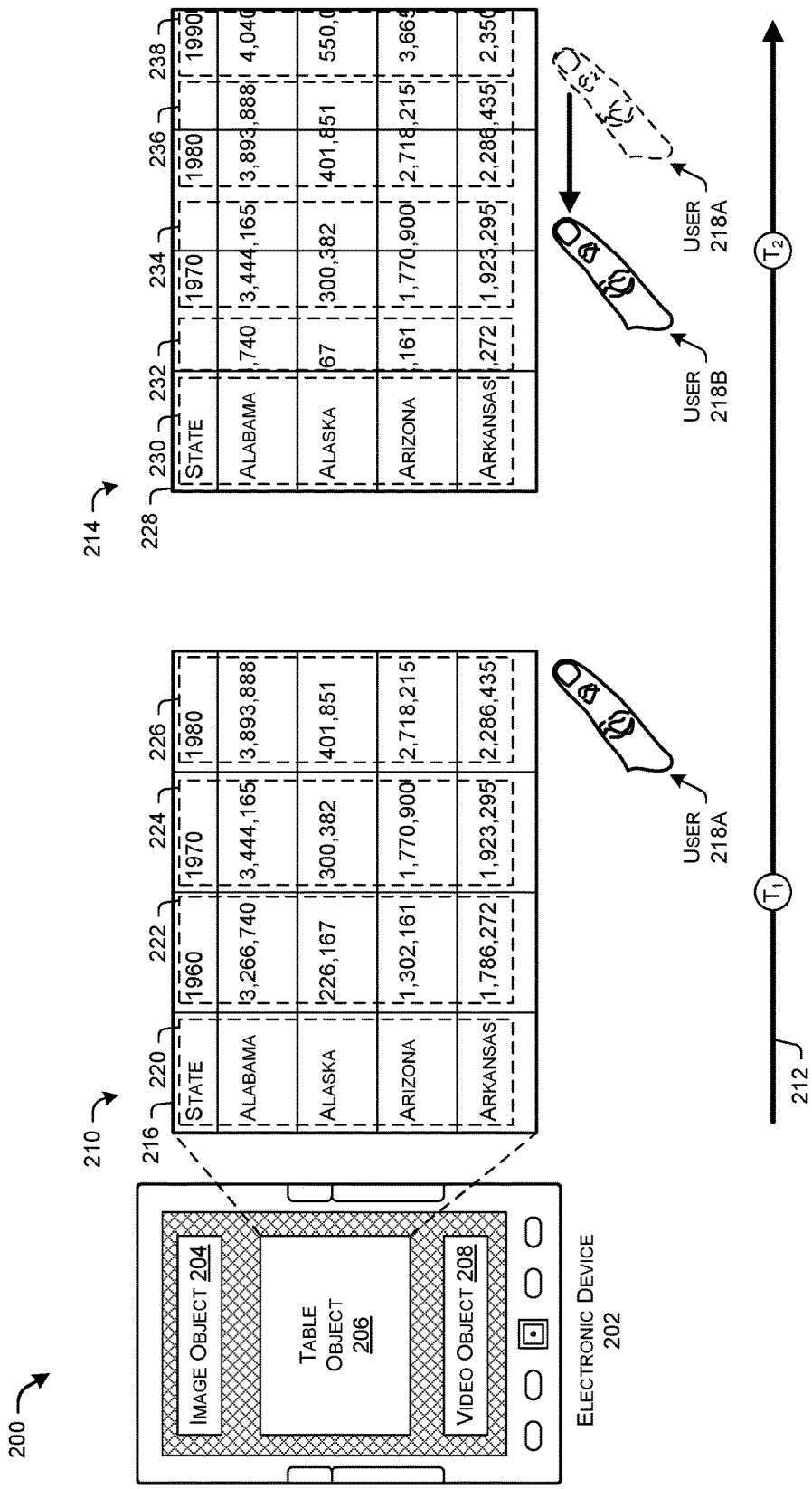
FIG. 2A shows an illustrative sliding transition within a table displayed on an electronic device.

FIG. 2A shows an illustrative sliding transition 200 within a table displayed on an electronic device 202. In some instances, the electronic device 202 may display content including an image object 204, a table object 206, and a video object 208. In some instances, the table object 206 can be represented as a table 210 at a time $T_1$ on a timeline 212, and as a table 214 at a time $T_2$ on the timeline 212.

In some instances, the table object 206 may be sized such that an entire width or height of the table object 206 may not be represented within a single page of the electronic device 202. For example, as illustrated, the table object 206 may include census data from the United States, including population data organized by state and for decades spanning from 1960 to 2010. However, in this example, as illustrated by the table 210, the electronic device 202 may display five rows and 4 columns at a time. More specifically, the table 210 may include a table framework 216 (e.g., including horizontal and vertical grid lines), table headings 220, and table data 222, 224, and 226, representing population data by decade. For example, the table 210 illustrates that the population of Alabama was 3,266,740 people in 1960.

As discussed above, the table object 206 may include more data than can be displayed at a single time in the table 210. At a time $T_1$, however, a user 218A may navigate to additional data in the table object 206 by activating a touch pad or touch screen associated with the electronic device 202, for example, to display additional data. For example, the user 218A can navigate within the table object 206 by sliding his or her finger on the display, for example, to a point illustrated by a user 218B at a time $T_2$, which is subsequent in time to $T_1$. As may be understood, the user 218 may navigate within the table object 206 using a variety of inputs, as discussed herein.

In some instances, the table 210 may transition to the table 214 by applying a transition to data within the table and refraining from applying a transition to common table content. For example, in order to maintain a context for the user 218, the table framework 216 may remain unchanged as a table framework 228 in the table 214. Further, the table headings 220 may remain unchanged as table headings 230 in the table 214. However, based at least in part on the user movement from 218A to 218B, table data 232, 234, 236, and 238 may transition as an animation by sliding within the table 214. For example, the cutoff number "740" in the data 232 of the table 214 may correspond to a portion of the data 222 in the table 210. That is, data columns of the table object 206 may transition to display more data, while portions of the table object 206 may remain fixed (e.g., the table framework 216 and 228, and the table headings 220 and 230). In some instances, the transition applied to the transitioning data may be based at least in part on the common content in the tables 210 and 214. For example, as the data 232 transitions out of the table 214, the transition may be such that the data 214 does not overlap common content in the table, such as the table headings 230. In this manner, a context of the table 214 may be maintained to improve a user experience.

Although FIG. 2A illustrates transitions among decades in the table object 206, it may be understood that transitions may be provided between the various states of the United States. That is, both horizontal and vertical transitions may be applied to the table object 206, in accordance with the techniques described herein. In a case including vertical transitions, for example, the column headings indicating the decade (e.g., "1960", "1970", and "1980") may remain as common content (e.g., fixed) while table data including additional states may be displayed as transitioning data on the display of the electronic device 202.

Figure 2B:
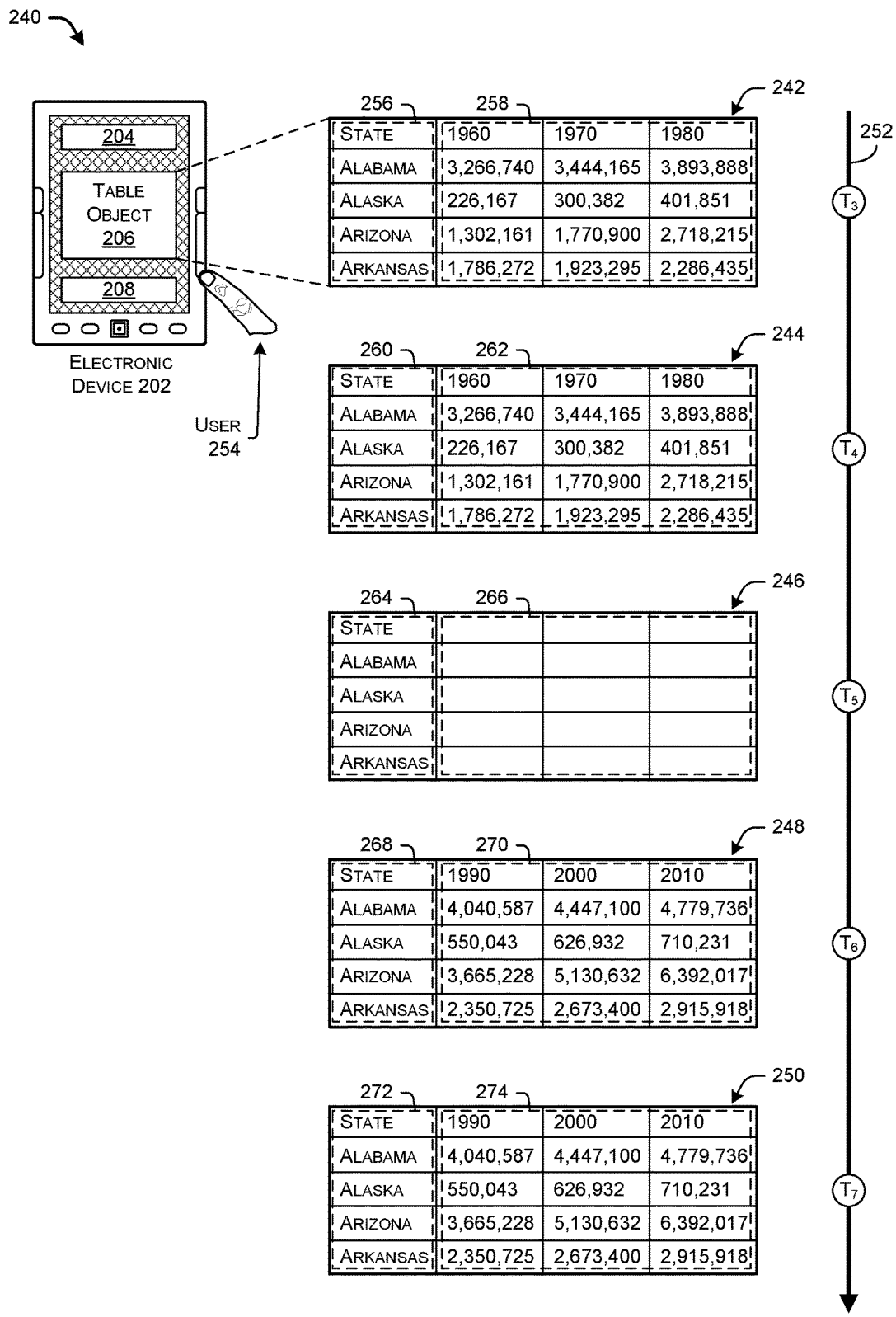
FIG. 2B shows an illustrative fading transition within a table displayed on an electronic device.

FIG. 2B shows an illustrative fading transition 240 within a table displayed on the electronic device 202. For example, the table object 206 may be represented as tables 242, 244, 246, 248, and 250 at various times $T_3$, $T_4$, $T_5$, $T_6$, and $T_7$ on a timeline 252, respectively. For example, a user 254 can provide an indication to the electronic device 202 by activating a navigation button or a touch screen to navigate within the table object 206.

At time $T_3$, which is subsequent in time to $T_2$, the table 242 displays table headings 256 and table data 258. Again, by way of example, the table 242 illustrates census data of the United States indicating state populations by decade. For example, the table 242 represents population data for the decades 1960, 1970, and 1980, for states Alabama, Alaska, Arizona, and Arkansas. At time $T_3$, the user 254 may provide an indication to the electronic device 202 to navigate to additional data within the table object 206.

At time $T_4$, which is subsequent in time to $T_3$, a transition is provided between the table 242 and the table 244 such that common content of the table, such as table headings 260 and the table framework, remain unchanged, while a transition may be applied to the table data represented as table data 262. In some instances, such as that illustrated in the table 244, a transition may be effected by fading the table data 262 out of the table 244.

At time $T_5$, which is subsequent in time to $T_4$, the transition may be applied to the table 246 such that table data fields 266 are blank. In some instances, the timing on the transition may be adjusted to provide a pleasant user experience, such that the user perceives the table data 258 gradually transitioning (fading) towards the table data 262 until no data is displayed.

At time $T_6$, which is subsequent in time to $T_3$, the transition continues with the table headings 268 unchanged and with table data 270 fading into (e.g., increasing in opacity or visibility) the table 248. For example, the table data 270 represents the population of Alabama, Alaska, Arizona, and Arkansas in the decades 1990, 2000, and 2010. For example, because there is no overlap in decades between the table data 258 and 270, for example, a context of data may be lost in the transition. However, by maintaining the table headings 256, 260, and 268, a table context may be maintained. At time $T_7$, which is subsequent in time to $T_6$, the table 250 is illustrated with table headings 272 and table data 274, with a transition complete.

Figure 3:
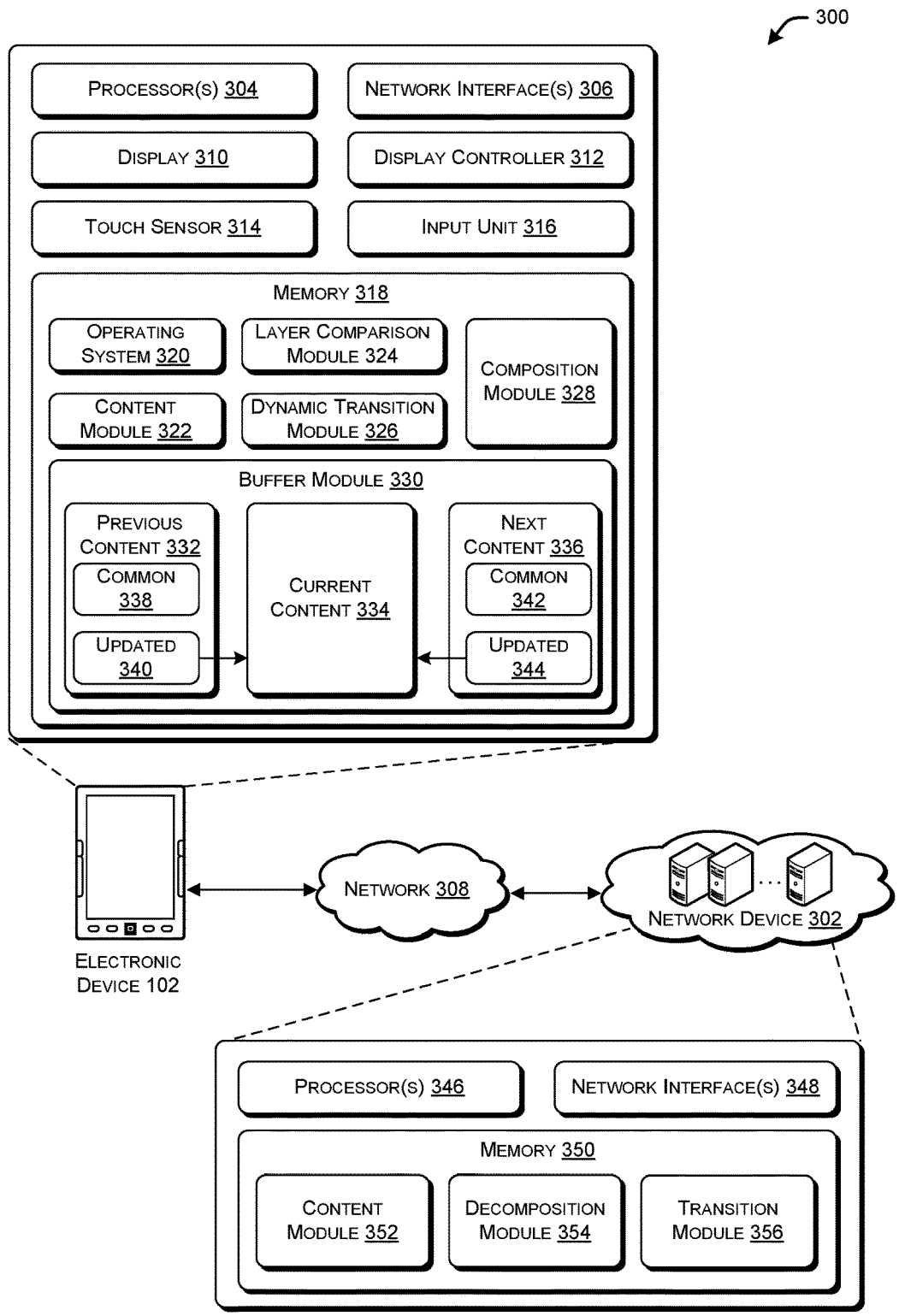
FIG. 3 shows an illustrative architecture including an electronic device and a network device for generating content and applying dynamic transitions to the content.

FIG. 3 shows an illustrative architecture 300 including an electronic device 102 and a network device 302 for generating content and applying dynamic transitions to the content. In some instances, the electronic device 102 may comprise any type of mobile electronic device (e.g., a laptop computer, a tablet computing device, an electronic reading device (e.g., an electronic book (eBook) reader device), a multifunction communication device, a portable digital assistant (PDA), a mobile phone, a smartphone, a gaming console, etc.) or non-mobile electronic device (e.g., a desktop computer, a television, etc.). In addition, while FIG. 3 illustrates several example components of the electronic device 102, it is to be appreciated that the electronic device 102 may also include other conventional components, such as system busses, input/output components, and the like.

In various embodiments, the electronic device 102 includes one or more processors 304 and one or more network interfaces 306. The processor(s) 304 may include any one or more central processing units or graphic processing units. The network interface(s) 306 may support both wired and wireless connection to network 308 and various other networks, such as cellular networks, radio, Wi-Fi networks, short range networks (e.g., Bluetooth, LoRa, Zigbee, etc.), infrared, and so forth.

The electronic device 102 also includes one or more displays 310 and corresponding display controllers 312. The one or more displays 310 may represent a variety of displays, including but not limited to light emitting diode (LED) displays, liquid crystal displays (LCDs), cathode-ray tube (CRT) displays, projection displays, electronic paper displays and/or other displays having similar display properties to those described herein.

Electronic paper displays represent an array of display technologies that largely mimic the look of ordinary ink on paper. In contrast to conventional backlit displays, electronic paper displays typically reflect light, much as ordinary paper does. In addition, electronic paper displays are often bistable, meaning that these displays are capable of holding text or other rendered images even when very little or no power is supplied to the display.

In one implementation, an electronic paper display comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may be situated at varying locations between the front and rear sides of the display to produce varying shades of gray.

Of course, while one example has been given, it is to be appreciated that the electronic paper displays described herein may comprise any other type of electronic paper technology, such as gyricon displays, electrowetting displays, electrofluidic displays, interferometric modulator displays, cholestric liquid crystal displays, and the like. In addition, while some of the displays described below are discussed as rendering black, white, and varying shades of gray, it is to be appreciated that the described techniques apply equally to electronic paper displays capable of rendering color pixels. As such, the terms "white", "gray", and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter.

The display controller(s) 312 may each be associated with a display 310 and may interface with display drivers of the electronic device 102, an operating system of the electronic device 102, and/or applications of the electronic device 102. The display controller(s) 312 may include hardware and/or software components configured to interface with and control the display(s) 310. In some instances, the display controller(s) 312 may implement, entirely or in part, the transition techniques described herein.

In various embodiments, the electronic device 102 includes one or more touch sensors 314. In some instances, at least one touch sensor 314 resides underneath or on top of a corresponding display 310 to form a touch-sensitive display that is capable of both accepting user input and rendering content corresponding to the input. In other instances, the electronic device 102 may include a touch sensor 314 that is adjacent to a display 310. It is to be appreciated that each of the techniques described below may apply to instances where the touch sensor 314 and the display 310 form a touch-sensitive display and instances where the sensor 314 and the touch-sensitive display 310 do not form such a display.

The touch sensor 314 may comprise a capacitive touch sensor, an interpolating force sensitive resistance (IFSR) sensor, or any other type of touch sensor. In some instances, the touch sensor 314 is capable of detecting touches as well as determining an amount of pressure or force of these touches. For instance, the touch sensor 314 may comprise an ISFR sensor resident behind a display 310, such that a user is able to draw upon the display utilizing a writing instrument, such as a stylus, a finger of the user, or the like.

In some instances, the electronic device 102 may further include an input unit 316 in addition to the touch sensor 314. The touch sensor 314 is to be understood as one possible type of input unit 316. Other input units 316 may include keyboards, key pads, computer mice, joysticks, video cameras (e.g., for gesture-based inputs), microphones (e.g., for audio input and/or voice-based commands), etc. The input units 316 may include any input mechanism.

Depending on the configuration of the electronic device 102, the memory 318 (and other memories described throughout) is an example of computer-readable storage media and may include volatile and nonvolatile memory. Thus, the memory 318 may include, but is not limited to, RAM, ROM, EEPROM, flash memory, or other memory technology, or any other medium which can be used to store media items or applications and data which can be accessed by the electronic device 102.

In various embodiments, the memory 318 may be used to store an operating system 320. In some instances, the operating system 320 may be any sort of operating system. The operating system 320 may interface with the display controller(s) 312 to provide content stored in a content module 322 on the display(s) 310 as well as instructions for controlling the displaying and transitioning of content. In some embodiments, the operating system 320 includes drivers for interfacing with hardware components of the display controller(s) 312. In some embodiments, drivers of the operating system 320 for interfacing with the display 310 may invoke a layer comparison module 324, a dynamic transition module 326, and a composition module 328 to generate and display content and/or transitions on the display 310.

In some instances, the memory 318 may include a buffer module 330 including buffers for previous content 332, current content 334, and next content 336. Further, the previous content buffer 332 may be logically or physically partitioned into portions such as a common portion 338 and an updated portion 340. The buffer for next content 336 may be logically or physically partitioned into portions such as a common portion 342 and an updated portion 344, for example. In some instances, the buffer module 330 may include one or more display buffers to store content to be rendered on the display 310 of the electronic device 102.

In general, content to be presented by the electronic device 102 is stored in the content module 322. When a user is navigating within various pages of the content, the user may provide an indication to the electronic device to transition from a current page to a target page. For the purposes of this discussion, the current page may correspond to the page/portion of electronic content that is currently being displayed via the display(s) 310. The target page may correspond to the page/portion of the electronic content that is to be subsequently displayed via the display(s) 310, such as a previous page/portion of the electronic content, a next page/portion of the electronic content, or any other page/portion of the electronic content. In some instances, the current page and target page may be stored in the buffer module 330. If the target page corresponds to the next page stored in the buffer module 330, the layer comparison module 324 may compare individual layers in the current page and the target page to determine if there is common content in the current page and the target page. Further, the layer comparison module 324 may compare individual layers in the current page and the target page to determine if there is content to be updated between the current page and the target page. Based at least in part on the determination by the layer comparison module 324, the dynamic transition module 326 may determine one or more transitions for the content in the current page and the target page. The composition module 328 may render the current page and any animations between the current page and the target page to present the content to the user.

In some instances, the content module 322 may include text, graphics, audio, backgrounds, images, videos, animations, tables, etc., which represents content to be displayed or otherwise presented on the electronic device 102. In some instances, content in the content module 322 may be included in or associated with other electronic content, such as an electronic book, a graphic novel, an electronic comic book, an interactive illustrated book, a movie, an animation, etc. The network device 302 may provide content to the electronic device 102, either automatically or in response to a request from the electronic device 102. Additional details of the content module 322 are described in connection with FIG. 4.

In some instances, the layer comparison module 324 receives content from the content module 322 and/or from the buffer module 330 to compare individual content layers to determine common content between a current page and a target page and/or to determine updated content between a current page and a target page. In some instances, the buffer module 330 may compare data associated with the content layers, including but not limited to content data, data size of the content data, resource identifiers, one or more view indices, location data (e.g., of the content to be rendered on the display), etc. Further, the layer comparison module 324 may mark or otherwise provide an indication to the composition module 328 regarding which content is to be updated and which content is to remain constant. That is, the layer comparison module 324 may provide an indication of which content is to be animated in a transition and which content is to remain fixed on the display 310.

In some instances, the dynamic transition module 326 receives indications from the content module 322 and/or the layer comparison module 324 and determines whether to apply a transition for an individual content layer between a current page and a target page, and if so, which transition to apply. In some instances, the dynamic transition module 326 may determine a transition to apply based on the content in a current page and content in a target page. For example, if the layer comparison module 324 indicates that a particular content layer between a current page and a target page is to be updated, the dynamic transition module 326 may determine to apply a transition to be animated, such as a sliding transition, fading transition, covering transition, wiping transition, etc. In some instances, selecting a transition may be based in part on a type of content (e.g., video, text, image, etc.), a size of content, color differences between a current page and a target page, preferences of an author or provider of the content, processing power of an electronic device presenting the content, etc. In some instances, as discussed in connection with FIG. 4, one or more content layers may include a preferred transition between one or more types of content layers.

Further, the dynamic transition module 326 may determine to apply a transition based in part on locations of other content within a current page and a target page. For example, considering the transition 112 in FIG. 1A, the transition 112 of the text object 138 may be set such that the transition 112 is constrained by the sidebar 118 presented on the display 114. For example, the dynamic transition module 326 may select a transition (including a range on the display where a transition may occur) such that common content is not disturbed by the transition. In some instances, the transitioning content (e.g., the text object 138 in FIG. 1A) may appear to slide under the common content (e.g., the sidebar 118), and in some instances, the transitioning content (e.g., the text object 138 in FIG. 1A) may appear to slide over the common content (e.g., the sidebar 118).

In some instances, the composition module 328 receives content from the content module 322 and/or from the buffer module 330 to render the content for presentation in the display 310 of the electronic device 102. In some instances, the composition module 328 may generate a bitmap image from the data.

In some instances, the buffer module 330 includes one or more buffers that are logically or physically partitioned to store data to be presented on the electronic device 102. In some instances, the buffer module 330 may include the previous content 332 buffer, the current content 334 buffer, and/or the next content 336 buffer. Considering an example where particular page (e.g., page 2) of an electronic comic is presented on the display of the electronic device 102, the previous content 332 buffer may store page 1 of the electronic comic, and the next content 336 buffer may store page 3. In some instances, in response to a user navigating to a particular page, the operating system 320 may transfer or load a previous page and a next page (relative to the particular page) into the respective buffers in the buffer module 330. Further, with respect to the previous content 332 buffer and the current content 334 buffer, the layer comparison module 334 may automatically determine content that is common between the previous page and the current page, and content that is to be updated between the previous page and the current page, and may store the content (or an indication associated with the content) in the respective common portion 338 and the updated portion 340. The layer comparison module 324 may perform similar processing between the current page and the next page (respectively), and may store any common content (or an indication associated with the common content) in the common portion 342 and may store the updated content (or an indication associated with the updated content) in the updated portion 344. Thus, the operating system 320 and/or the layer comparison module 324 may perform preprocessing to determine common content and updated content, and may store the corresponding data (or an indication, such as a pointer) in the buffer module 330. Thus, when the electronic device 102 receives an indication to navigate to the next page, the next page becomes the target page and transitions may be applied based on the updated content between the current page and the target page.

In some instances, as the electronic device 102 receives indications to navigate from page to page of an electronic book, for example, a page that is a current page may be updated to indicate that the current page at a first time is a previous page at a later time.

The memory 318 may further include one or more applications, including user-level applications of a platform of the electronic device 102 and third party applications. The applications may include one or more modules for generating and/or providing content for display. The modules of the applications may provide the content to a driver of the operating system 320.

In various embodiments, the operating system 320 receives indications from drivers associated with the touch sensors 314 or the input unit 316 of input associated with manipulation a page of content and/or to navigate within and between pages of content. For example, a user may touch the display 310, making a sliding or swiping gesture with the user's fingers that is associated with a navigation to another page. In some instances, a user may swipe directly on content (e.g., within a table, or on a video) to navigate within (and/or to invoke transitions within) the content.

In some instances, the input unit 316 may receive an indication that the user is navigating to another page or within a particular content layer (e.g., a table) via a navigation button, via directional arrows, or via a joystick. In response to receiving the indication, the operating system 320 may invoke the various modules to apply one or more transitions to content in accordance with the disclosure.

In some instances, the electronic device 102 may have features or functionality in addition to those that FIG. 3 illustrates. For example, the device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 102 may reside remotely from the device 102 in some implementations. In these implementations, the device 102 may utilize the network interface(s) 306 to communicate with and utilize this functionality.

In various embodiments, the electronic device 102 is connected via a network 308 to the network device 302. The network 308 may be include any one or more networks, such as wired networks, wireless networks, and combinations of wired and wireless networks. Further, the network 308 may include any one or combination of multiple different types of public or private networks (e.g., cable networks, the Internet, wireless networks, etc.). In some instances, the electronic device 102 and the network device 302 communicate over the network 308 using a secure protocol (e.g., https) and/or any other protocol or set of protocols, such as the transmission control protocol/Internet protocol (TCP/IP).

Also, in further instances, the network device 302 may comprise one or more computing devices, and each computing device may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the computing device(s) of the network device 302 represent a plurality of computing devices working in communication, such as a cloud computing network of nodes. When implemented on multiple computing devices, the network device 302 may distribute the modules and data 352, 354, and 356 of the network device 302 among the multiple computing devices. In some implementations, one or more of the computing device(s) of the network device 302 represents one or more virtual machines implemented on one or more computing devices.

In some embodiments, the computing devices of the network device 302 include processor(s) 346 and network interface(s) 348. The processor(s) 346 may be or include any sort of processing units, such as central processing units (CPU) or graphic processing units (GPU). The network interface(s) 348 allow the devices of the network device 302 to communicate with one or both of the electronic device 102 and other devices. The network interface(s) 348 may send and receive communications through one or both of the network 302 or other networks. The network interface(s) 348 may also support both wired and wireless connection to various networks.

Depending on the configuration of the computing device (s) of the network device 302, the memory 350 (and other memories described throughout) is an example of computer-readable storage media and may include volatile and non-volatile memory. Thus, the memory 350 may include, but is not limited to, RAM, ROM, EEPROM, flash memory, or other memory technology, or any other medium which can be used to store media items or applications and data which can be accessed by the network device 302. In various embodiments, the memory 350 may be used to store a content module 352, a decomposition module 354, and a transition module 356.

In some instances, the content module 352 may correspond with the content module 322 in the electronic device 102. For example, the network device 302 may generate content to be provided to the electronic device 102 in a format such that the electronic device 102 may apply transitions in accordance with the disclosure. In some instances, the content module 352 may include text, graphics, audio, backgrounds, images, videos, animations, tables, etc. In some instances, content in the content module 352 may be included in or associated with other electronic content, such as an electronic book, an electronic comic, an interactive illustrated book, etc. The network device 302 may provide content to the electronic device 102, either automatically or in response to a request from the electronic device 102.

In some instances, the decomposition module 354 may include functionality to receive electronic content and determine and/or generate individual content layers which make up pages of content. For example, the decomposition module 354 may receive an electronic book, for example, and may decompose the book into individual pages. Within each individual page, the decomposition module 354 may segment by region, content type, colors, etc. the content into individual content layers. In some instances, the decomposition module 354 may generate a page tree (also referred to as a view tree) for each page in an electronic book. In some instances, the decomposition module 354 may generate, at least in part, the page tree as described in connection with FIG. 4. In some instances, the decomposition module 354 may operate in conjunction with the transition module 356 to generate and provide content to the content module 352 so that the content may be provided to the electronic device 102.

In some instances, the transition module 356 may include functionality to determine one or more transitions associated with various content layers, as described herein. For example, as the content is decomposed into the individual layers by the decomposition module 354, the transition module 356 may provide transitions between various layers while the content is to be presented on the display 310 of the electronic device 102. In some instances, selecting a transition may be based in part on a type of content (e.g., video, text, image, etc.), a size of content, color differences between a current page and a target page, preferences of an author or provider of the content, processing power of an electronic device presenting the content, etc.

In some instances, the computing device(s) of the network device 302 may have features or functionality in addition to those that FIG. 3 illustrates. For example, the computing device(s) of the network device 302 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the computing device(s) of the network device 302 may reside remotely from the computing device(s) of the remote service 302, in some implementations. In these implementations, the computing device(s) of the network device 302 may utilize the network interface(s) 348 to communicate with and utilize this functionality.

Figure 4:
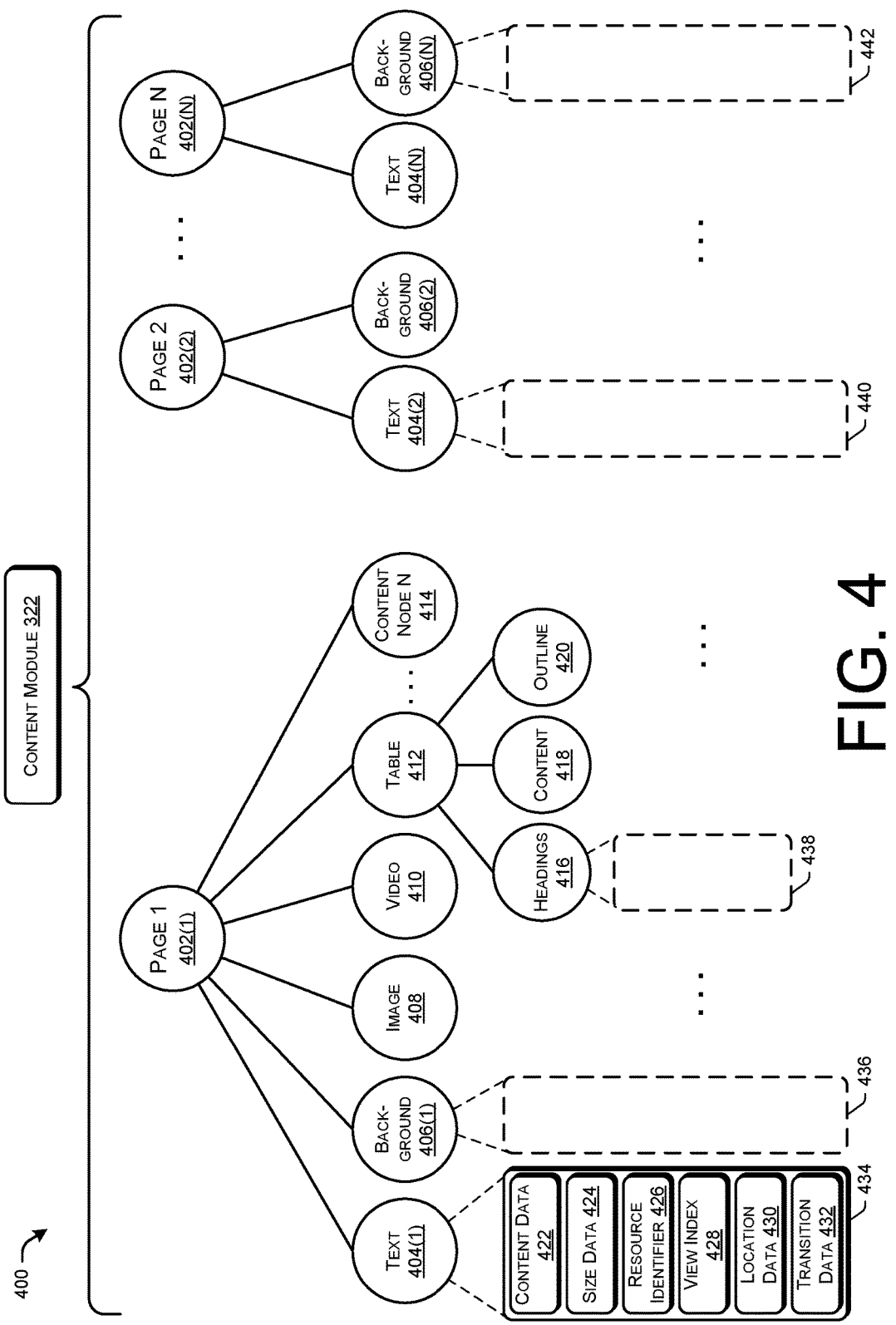
FIG. 4 illustrates a page of electronic content decomposed into a page tree with associated content layer data.

FIG. 4 illustrates a page of electronic content 400 decomposed into a page tree with associated content layer data. In some instances, the electronic content 400 may be stored in the content module 320 or 352 of FIG. 3. As illustrated, the electronic content 400 may include a page 1 402(1), page 2 402(2), . . . , page N 402(N), and may include any number of pages or portions. Further, each page may be represented as an individual page tree, with the page 1 402(1) referred to as a root node in the page tree associated with the particular page. Each page tree (e.g., for the page 1 402(1)) may include one or more children nodes representing content layers to be displayed in connection with the particular page. For example, such children nodes may be linked to, may depend from, or may descend from a respective parent node. For example, the page 1 402(1) may include, but is not limited to one or more of text 404(1), background 404(1), image 408, video 410, table 412, content node N 414 (e.g., such as sidebar), etc. In some instances, children nodes (e.g., 404, 406, 408, 410, 412, and 414) in the page tree may include additional sub-nodes. For example, the table 412 node may include headings 416, content 418, and an outline 420, for example.

As may be understood, each page in the electronic content 400, such as page 2 402(2) may include one or more children nodes comprising the page tree. For example, the page 2 402(2) includes nodes 404(2) and 406(2), while page N 402(N) includes nodes 404(N) and 406(N). Further, pages 402(2) and 402(N) may include any number of nodes associated with any combination of content, in accordance with the disclosure.

By way of example, the text 404(1) node associated with the page 1 402(1) may include additional information 434 detailing the content associated with the particular node and related data. For example, the text 404(1) node may include content data 422, size data 424, a resource identifier 426, a view index 428, location data 430, and/or transition data 432. As may be understood, each node 404(1), 406(1) 408, 410, 412, 414, 416, 418, and 420 associated with the page 402(1) may include information 434 similar to that illustrated with respect to the text 404(1) node. For example, such additional information has been illustrated as, and is not limited to, additional information 436, 438, 440, and 442.

In some instances, the content data 422 may include data presented on a display of the electronic device 102, for example. In the case of the text 404(1) node, the content data 422 may include the text to be displayed, fonts, character spacing, etc., associated with presenting the information. In a case of the video 410 node, the content data 422 may include one or more frames of video and associated audio to be presented via the electronic device 102.

In some instances, the size data 424 may include a measurement of the size of the content data 422. For example, the size data 424 may refer to a scaling of an image at 100% of an original size, or any variation thereof. In some instances, the size data 424 may refer to a file size (e.g., in bytes of data) associated with the content data 422. In some instances, the resource identifier 426 may include a unique identifier such as a character string that uniquely identifies each content layer. For example, the resource identifier 426 may be associated with the content data 422 to uniquely identify the text, for example, independent of any location data (e.g., where the text is to be presented on a display). In some instances, the resource identifier 426 may be associated with the specific node, such that the content data 422 associated with the particular view index 428 or location data 430 may be associated with the resource identifier 426.

In some instances, the view index 428 indicates a relationship between layers as the individual layers are rendered on a display. For example, considering a case where the background 406(2) has a view index of 1, the text 404(1) has a view index 428 of 2, and the image 408 has a view index of 3, the view indices define the ordering of the layers relative to each other. For example, the background 406(2) may be rendered as the lowest layer, while the text 404(1) and the image 408 may be displayed above the background 406(2). However, relative to the image 408, the text 404(1) has a lower view index 428. Thus, if the text 404(1) and the image 408 are to be located at a same location, the image 408 may be visible above the text 404(1), for example. In some instances, each node in an individual page may have a unique view index 428. However, similar nodes of different pages (e.g., nodes 404(1) and 404(2) of pages 402(1) and 402(2), respectively) may be associated with the same view index, which may be used by the layer comparison module 324 of FIG. 3 to compare content layers between pages, for example.

In some instances, the location data 430 may indicate where the content data 422 is to be located within the page 1 402(1), for example. In some instances, the location data 430 may specify absolute locations on a page. In some instances, the location data 430 may specify relative locations on a page, such that the content layers may be scaled and located accordingly as the content is rendered on different sized displays or when a portion of a display is enlarged or reduced (e.g., via a zoom-in or zoom-out operation).

In some instances, the transition data 432 may include one or more preferred transitions when the particular node 404(2) is transitioned into a display or out of a display. In some instances, the transition data 432 may be set by an author or provider of the content data 422, while in some instances, the transition data 432 may be provided by the transition module 356 of the network device 302 in FIG. 3. In some instances, the transition data 432 may control a timing of transitions between pages. For example, in the video 410 node, transition data may specify that when a user has provided an indication to play the video, the video 410 may provide an indication to transition to another page (e.g., initiating the transitioning of text) based upon the timing of a page. For example, if a user is watching a video, a time point may be reached in the video causing the device to transition from the current page to a target page. Further, the transition data may specify a transition associated with the changing of the page, and/or which page number (e.g., page N) is the target page.

For example, and without limitation, the transition data 432 may include one or more of a sliding transition (e.g., right to left, left to right, up to down, down to up, etc.), a fade transition, a cut transition, a push transition, a wipe transition, an uncover transition, a cover transition, etc. In some instances, a sliding transition may include one content layer sliding over/under another content layer from one or more directions. In some instances, a fade transition may include a content layer gradually becoming transparent, thereby exposing one or more content layers as the transitioning content layer disappears. In reverse, the fade transition may include a content layer gradually becoming more opaque, thereby covering one or more content layers as the transitioning content layer appears. In some instances, a cut transition may include an abrupt import or export of content from the display. In some instances, a push transition may include incoming content "pushing" outgoing content out of a display. In some instances, a wipe transition may include transitioning content incoming or outgoing via a shape (e.g., a growing or shrinking star, circle, heart, a clock hand exposing content, etc.). In some instances, an uncover transition may include outgoing content to transition out of a display (e.g., via a sliding transition) with incoming content located below the outgoing content in the final location of the incoming content. In some instances, a cover transition may include incoming content covering up current content while the current content is unmoved. In some instances, each of the transitions described may be applied to content appearing on a display or disappearing from the display.

In some instances, a particular node may refer to or may be linked to another node. For example, the pages 402(1) and 402(2) may be associated with a same background. In such a case, background data may be stored and/or associated with content data associated with the background 406(1) node, while the background node 406(2) may include a reference or a pointer to the background 406(1). In some instances, the background 406(2) node may include a same resource identifier as the background 406(1) to aid in comparing the nodes 406(1) and 406(2).

Referring to the layer comparison module 324 of FIG. 3, the layer comparison module 324 may compare node data between nodes having the same view index to determine if a current page includes common content as a target page. For example, if the current page corresponds to the page 1 402(1) and the target page corresponds to the page 2 402(2), the layer comparison module 324 may compare one or more of the resource identifiers, data size, view index, etc., to determine if the content is common between the same nodes. Upon determining that the background 406(1) is the same as the background 406(2), for example, the layer comparison module 324 may indicate that the background 406(2) is common content, and may not apply a transition to the content layer when transitioning from the current page to the target page. By way of another example, the layer comparison module 324 may compare the text 404(1) node and the text 404(2) node and determine that the text 404(2) is updated content, and may mark the text 404(2) to be updated according to a transition specified in the associated transition data.

By way of another example, the layer comparison module 324 may compare node data between nodes of a current page and a target page having a same resource identifier 426, but may determine that the nodes may have different size data 424 and/or different location data 430. For example, a current page may include a first image at a first location, and a target page may include the same image (e.g., corresponding to the same resource identifier 426) but the image may be scaled differently between the two pages (e.g., the size data 424 may indicate a different scaling) and/or the image may be presented at different locations on a display (e.g., the location data 430 may refer to different locations). In such a case, the dynamic transition module 326 may determine one or more transitions to apply to the data based on the differences in the node data. For example, if the difference between the images corresponds to a size difference, a transition may be selected as a shrink transition or a grow transition to transition between the two content nodes. In another example, if the difference between the images corresponds to a location difference, a transition may be selected as a slide transition. It may be understood that these examples are merely illustrative, and the dynamic transition module 326 may select any number of transitions based on any number of factors.

Referring to the table 412 node, in some instances, the headings 416 may correspond to the table headings 220 and 230 in FIG. 2A, the content 418 may correspond to the table data 222, 224, 226, 232, 234, 236, and 238, for example, in FIG. 2A, and the outline 420 may correspond to the table framework 216 and 228 in FIG. 2A. Thus, the page tree including the table 412 node may allow the electronic device 102 to provide dynamic and selective transitions to various aspects of a table displayed on the electronic device 102.

Figure 5:
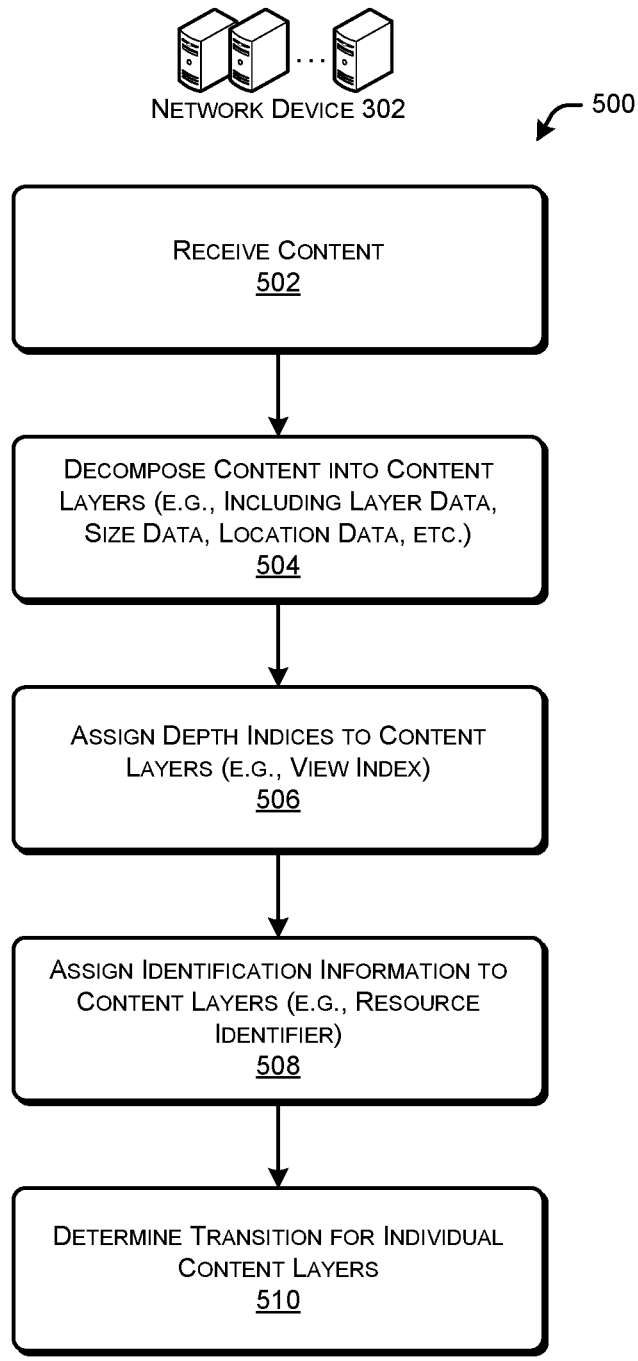
FIG. 5 illustrates a process for decomposing content into layers including transitions for individual content layers.
Figure 6:
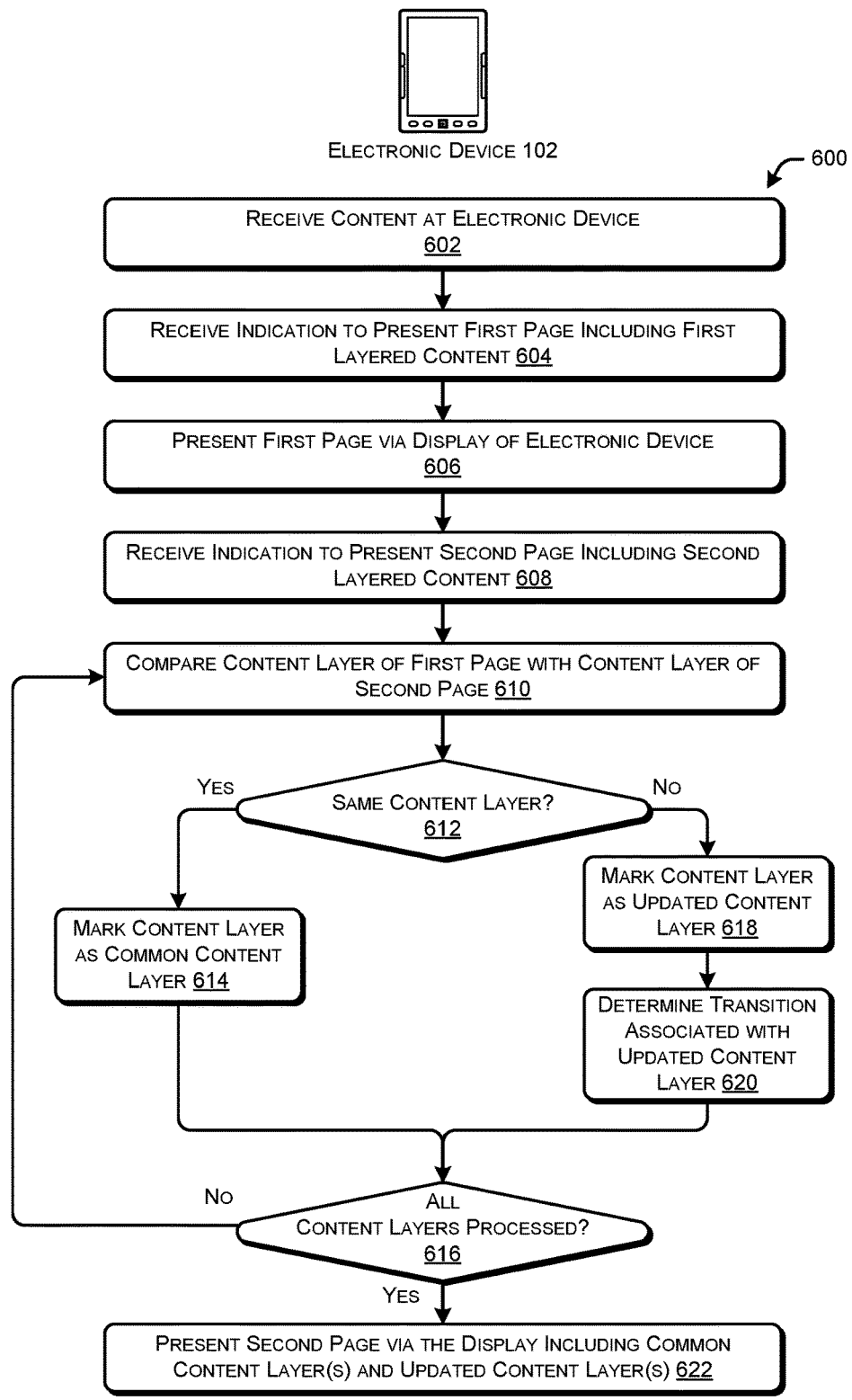
FIG. 6 illustrates a process for providing transitions between pages while presenting content on an electronic device.

FIGS. 5 and 6 illustrate example processes in accordance with embodiments of the disclosure. Each process described herein is illustrated as a logical flow graph, each operation of which represents a sequence of operations that can be implemented in hardware, software, or a combination thereof. In some instances, the order in which the operations are described is not intended to be construed as a limitation, and any number of the described operations can be combined in any order and/or in parallel to implement the process. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

FIG. 5 illustrates a process 500 for decomposing content into layers including transitions for individual content layers. For example, aspects of the process 500 can be performed by the network device 302, as illustrated in FIG. 3.

At 502, the operation may include receiving content at the network device 302. For example, the network device 302 may receive content from content publishers or authors. This operation 502 may include receiving the content via the network 308, as described above in FIG. 3.

At 504, the operation may include decomposing the content into layers, for example, which may include layer data, data size, location data, etc. For example, the operation 504 may be performed by the decomposition module 354 in FIG. 3 to define the various types of content represented within a page of content. For example, if a page is received with a background, text, and an image, the operation 504 may include defining individual content layers for each content type.

At 506, the operation may include assigning depth indices to context layers, which may include assigning view indices, as discussed above in connection with FIG. 4. For example, a view index may be assigned to individual content layers to provided ordering to the layers to determine which layers are displayed on top of other layers. Further, the view indices may be used, in part, to determine if a current page and a target page contain common content. In some instances, when content is received as an electronic file, view indices can be determined and/or assigned based on spatial relationships between content in the file. For example, in some instances, background content may be assigned to have a lower view index than text in an electronic book.

At 508, the operation may include assigning identification information to content layers, for example, as resource identifiers. In some instances, a resource identifier is assigned to items within each page. For example, a background of a page may have a first resource identifier, text on a page may have a second resource identifier, and an image may have a third resource identifier. In some instances, content that is common between two or more pages may be associated with the same resource identifier. For example, the same image on the two different pages may include the same resource identifier. In some instances, identification information may include a pointer to or a link to content associated with another page. For example, a pointer may function as a placeholder in a page tree to link content in a node to the content in another node. In some instances, a file size of electronic content may be reduced by providing linking data between nodes rather than reproducing content data in each node.

At 510, the operation may include determining a transition for individual content layers within the page tree. For example, transitions may be assigned in the operation 510 and may be applied in response to receiving an indication that the particular content is to be presented on a display of the electronic device 102. In some instances, a transition may be based in part on a location of content on a page, a preference of an author or publisher, the capabilities of a device, etc.

FIG. 6 illustrates a process 600 for providing transitions between pages while presenting content on an electronic device. For example, aspects of the process 600 can be performed by the electronic device 102, as illustrated in FIG. 1.

At 602, the operation includes receiving content at an electronic device, such as the electronic device 102 of FIG. 1. In some instances, the content may be downloaded via the network 308 in response to a request by the electronic device 102. In some instances, the electronic device 102 may include an application that allows a user to browse a library for content, select content, and download the content to the electronic device 102. In some instances, the content may not be content that the user may edit. In some instances, the content may include digital rights management.

At 604, the operation may include receiving an indication to present a first page including first layered content. For example, the operation may include receiving a request from a user to display a particular page on a display of the electronic device 102. In some instances, the indication may be received via a touch screen, navigation button, voice command, gesture, etc. In some instances, the content may include layered content, such as content organized in a view tree as described in connection with FIG. 4.

At 606, the operation may include presenting the first page in a display of an electronic device, such as the electronic device 102. For example, this operation may include transferring data from a content storage module (e.g., the content module 322) to a buffer module (e.g., the buffer module 330) so that the data can be rendered onto a display of the electronic device 102. In some instances, the operation 606 may include presenting text, images, video, animations, audio, haptic feedback, etc., that is associated with a page of content. In some instances, the first page presented on the display of the electronic device 102 may be referred to as a current page.

At 608, the operation may include receiving an indication to present a second page including second layered content. For example, the indication may be received as a navigation request to turn a page in an electronic book to a next page or a previous page. In some instances, the operation may include receiving an indication to navigate to a page that is not immediately following the page presented in the operation 606. In some instances, the second page may be referred to as a target page.

At 610, the operation may include comparing content layers of the first page with content layers of the second page. For example, this operation 610 may be performed on an item-by-item basis, such that a content layer in the first page having a first view index is compared to a content layer in the second page having the same first view index. In some instances, a first page may have a content layer at a first view index while a second page may not have a content layer at that view index, and vice versa. In some instances, content layers are compared based on a location of the content layers to be presented on a display of the electronic device 102. That is, in some instances, the operation 610 may be performed based on location of data (e.g., regions or pixels) rather than based on view indices associated with content layers.

At 612, the operation may include determining whether the content layer of the first page is the same as the content layer of the second page. For example, if the resource identifier in each layers is the same ("Yes", operation 612), the operation 612 may proceed to the operation 614, where the content layer is marked as a common content layer. For example, the operation 614 may include updating a data flag or metadata associated with the content layer to indicate that the content layer of the second page is common content with respect to the first page.

At 616, the operation may include determining whether all content layers have been processed. For example, as illustrated in FIG. 4, individual pages may include a plurality of content layers (e.g., children nodes). In a case where all of the content layers have not been processed ("No", operation 616), the operation may proceed to the operation 610 to continue processing content layers. For example, the operation 616 may determine that all processing has not been performed by determining that one or more content layers associated with the first page and/or the second page are not associated with an indication that a content layer is common content or updated content.

Returning to the operation 612, if the operation 612 determines that a particular content layer (e.g., of the second page) is not a same content layer as a content layer in the first page ("No", operation 612), the operation proceeds to operation 618, where the operation may include marking the content layer as an updated content layer. For example, the operation 618 may include updating a data flag or metadata associated with the content layer to indicate that the content layer of the second page is updated content with respect to the first page and/or with respect to the view index of the first page.

At 620, the operation may include determining a transition associated with the updated content layer. In some instances, each node in the page view tree may be associated with transition data that may be applied to the particular content layer when that content layer is an updated content layer. In some instances, a transition may be determined based in part on a location of other common content. For example, a transition may be determined in the operation 620 such that transitioning content (e.g., the updated content layer) does not obstruct a presentation of common content. In some instances, a transition is determined based in part on a view index. For example, in some instances, content at a first view index is associated with a first transition, while content at a second view index is associated with a second transition. In some instances, a transition is determined based upon a location of the updated content within a page displayed on a screen of an electronic device, such as the electronic device 102.

Following the operation 620, the process determines at the operation 616 whether all content layers in the first page and/or the second page have been processed. In some instances, the operation 616 may determine that all content layers are processed ("Yes", operation 616) by determining that each content layer in the target page includes an indication that the content layer is common content (relative to the content layer of the first page) or that the content layer is updated content (relative to the content layer of the first page).

At 622, the operation may include presenting the second page in the display including the common content layer(s) and the updated content layer(s). In some instances, one or more transitions may be applied to the display to animate or otherwise indicate that the content has changed between the first page and the second page. In this manner, dynamic and selective transitions may be applied to content on a display of an electronic device to improve a user experience and to improve a functioning of a computer, as described herein.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An electronic device comprising:
a display;
one or more processors; and
one or more computer-readable media storing computer-executable instructions that, when executed by the one or more processors, cause the one or more processors to:
receive an interactive illustrated book as electronic content from a network device, the electronic content including a plurality of pages, a first page of the plurality of pages including a first root node, the first page including at least:
a first node linked to the first root node and including background content associated with a first resource identifier and a first view index,
a second node linked to the first root node and including first text content associated with a second resource identifier and a second view index, and
a third node linked to the first root node and including image content associated with a third resource identifier and a third view index;
receive a first indication to present the first page via the display of the electronic device;
present, via the display, the first text content over the background content based on a first determination that the second view index is greater than the first view index;
present, via the display, the image content over the background content based on a second determination that the third view index is greater than the first view index;
receive a second indication to present a second page of the plurality of pages via the display, the second page including a second root node, the second page including at least:
a fourth node linked to the second root node and including the background content associated with a fourth resource identifier and the first view index,
a fifth node linked to the second root node and including second text content associated with a fifth resource identifier and the second view index, and
a sixth node linked to the second root node and including the image content associated with a sixth resource identifier and the third view index;
determine that the first node and the fourth node represent first common content based on the first resource identifier, the fourth resource identifier, and the first view index;
determine that the second node and the fifth node represent updated content based on the second resource identifier, the fifth resource identifier, and the second view index;
determine that the third node and the sixth node represent second common content based on the third resource identifier, the sixth resource identifier, and the third view index;
determine a transition associated with the updated content;
animate, via the display, the transition between the first page and the second page by applying the transition to the first text content and the second text content, wherein the transition includes at least one change in at least one aspect of the first text content or the second text content over time; and
refrain from animating a movement of the background content and the image content during the transition between the first page and the second page.

2. The electronic device of claim 1, wherein the computer-executable instructions further cause the one or more processors to:
compare the first resource identifier and the fourth resource identifier to determine that the first resource identifier and the fourth resource identifier both represent the background content;
compare the second resource identifier and the fifth resource identifier to determine that the first text content is different than the second text content; and compare the third resource identifier and the sixth resource identifier to determine that the third resource identifier and the sixth resource identifier both represent the image content.

3. The electronic device of claim 1, wherein the image content associated with the third node is further associated with first size data and first location data;
 wherein the image content associated with the sixth node is further associated with second size data and second location data; and
 wherein the computer-executable instructions further cause the one or more processors to:
  compare the first size data and the second size data to determine that the image content associated with the third node and the image content associated with the sixth node is indicated to be scaled at a same size at a time at which the image content is to be presented on the display;
  compare the first location data and the second location data to determine that the image content associated with the third node and the image content associated with the sixth node is indicated to be located at a same location at the time at which the image content is to be presented on the display; and
  determine that the third node and the sixth node represent the second common content based on the first size data, the second size data, the first location data, and the second location data.

4. The electronic device of claim 1, wherein the computer-executable instructions further cause the one or more processors to:
 determine, based on the second view index being greater than the third view index, that the image content is to be rendered below the first text content and the second text content; and
 present, via the display, at least a portion of the transition by animating a movement of the first text content over the image content during the transition.

5. The electronic device of claim 1, wherein the computer-executable instructions further cause the one or more processors to:
 update a display buffer in the electronic device to store the updated content without overwriting the first common content stored in the display buffer and without overwriting the second common content stored in the display buffer.

6. A system comprising:
 one or more processors; and
 one or more computer-readable media storing computer-executable instructions that, when executed by the one or more processors, cause the one or more processors to:
  receive electronic content to be presented via a display;
  receive a first indication to present a first page of the electronic content via the display;
  present, as a current page, the first page via the display;
  receive a second indication to navigate to a target page in the electronic content;
  determine common content by determining that a first content layer associated with the current page is a same as a second content layer associated with the target page;
  determine updated content by determining that a third content layer associated with the current page is different than a fourth content layer associated with the target page;
  determine a transition for the updated content based at least in part on the updated content and on a location associated with the common content, wherein the transition is one of a plurality of transition types associated with the electronic content; and
  animate the transition via the display between the current page and the target page, wherein the transition includes a change associated with at least one aspect of the updated content.

7. The system of claim 6, wherein the computer-executable instructions further cause the one or more processors to:
 refrain from animating a movement of the common content via the display during the transition.

8. The system of claim 6, wherein the target page is a first target page, wherein the transition is a first transition, and wherein the computer-executable instructions further cause the one or more processors to:
 receive a third indication to navigate from the first page to a second target page in the electronic content;
 determine that the first content layer associated with the current page is different than a fifth content layer associated with the second target page;
 determine that the third content layer associated with the current page is different than a sixth content layer associated with the second target page;
 determine a second transition associated with the current page; and
 animate the second transition via the display between the current page and the second target page, the second transition applied to at least the first content layer and the third content layer associated with the current page.

9. The system of claim 6, wherein the computer-executable instructions further cause the one or more processors to:
 associate the first content layer of the first page with a resource identifier uniquely identifying content associated with the first content layer.

10. The system of claim 6, wherein the computer-executable instructions further cause the one or more processors to:
 associate the first content layer of the first page with a view index indicating that the first content layer is to be presented below the third content layer.

11. The system of claim 6, wherein the electronic content is received from a network device.

12. The system of claim 6, wherein the computer-executable instructions further cause the one or more processors to:
 compare the first content layer and the second content layer based in part on the first content layer and the second content layer being associated with a same view index, the view index indicating a layering level of content to be displayed on the display.

13. The system of claim 6, wherein the transition is a sliding transition, and wherein the computer-executable instructions further cause the one or more processors to:
 determine that the transition is the sliding transition based in part on a type of the third content layer and the fourth content layer.

14. The system of claim 6, wherein the first content layer and the third content layer are children nodes in a first view tree associated with the first page, and wherein the second content layer and fourth content layer are children nodes in a second view tree associated with the target page.

15. A method comprising:
 receiving electronic content to be presented via a display;
 receiving a first indication to present a first page of the electronic content via the display;
 presenting, as a current page, the first page via the display;

receiving a second indication to navigate to a target page in the electronic content;

determining common content by determining that a first content layer associated with the current page is a same as a second content layer associated with the target page;

determining updated content by determining that a third content layer associated with the current page is different than a fourth content layer associated with the target page;

determining a transition for the updated content based at least in part on the updated content and on a location associated with the common content, wherein the transition is one of a plurality of transition types associated with the electronic content; and animating the transition via the display between the current page and the target page, wherein the transition includes a change associated with at least one aspect of the updated content.

16. The method of claim 15, further comprising refraining from animating a movement of the common content via the display during the transition.

17. The method of claim 15, wherein the target page is a first target page, wherein the transition is a first transition, and further comprising:

receiving a third indication to navigate from the first page to a second target page in the electronic content;

determining that the first content layer associated with the current page is different than a fifth content layer associated with the second target page;

determining that the third content layer associated with the current page is different than a sixth content layer associated with the second target page;

determining a second transition associated with the current page; and animating the second transition via the display between the current page and the second target page, the second transition applied to at least the first content layer and the third content layer associated with the current page.

18. The method of claim 15, further comprising associating the first content layer of the first page with a resource identifier uniquely identifying content associated with the first content layer.

19. The method of claim 15, further comprising comparing the first content layer and the second content layer based in part on the first content layer and the second content layer being associated with a same view index, the view index indicating a layering level of content to be displayed via the display.

20. The method of claim 15, further comprising:

generating the first content layer and the third content layer as children nodes in a first view tree associated with the first page; and generating the second content layer and fourth content layer as children nodes in a second view tree associated with the target page.

\* \* \* \* \*